United States Patent
Yamashita (10) Patent No.: US 12,531,767 B2
(45) Date of Patent: Jan. 20, 2026

(54) MODULATION SCHEME IDENTIFICATION APPARATUS, CONTROL CIRCUIT, STORAGE MEDIUM, AND MODULATION SCHEME IDENTIFICATION METHOD

(71) Applicant: Mitsubishi Electric Corporation, Tokyo (JP)

(72) Inventor: Yasutaka Yamashita, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 358 days.

(21) Appl. No.: 18/298,849

(22) Filed: Apr. 11, 2023

(65) Prior Publication Data

US 2023/0246889 A1 Aug. 3, 2023

Related U.S. Application Data (63) Continuation of application No. PCT/JP2020/047482, filed on Dec. 18, 2020.

(51) Int. Cl.
- H04L 27/00 (2006.01)
- G06N 3/08 (2023.01)
- G06N 20/20 (2019.01)

(52) U.S. Cl.
CPC ........... H04L 27/0012 (2013.01); G06N 3/08 (2013.01); G06N 20/20 (2019.01)

(58) Field of Classification Search
CPC ...... H04L 27/0012; G06N 3/08; G06N 20/20; G06N 3/045; H04B 1/16
See application file for complete search history.

(56) References Cited

U.S. PATENT DOCUMENTS

| | | | | |
|---|---|---|---|---|
| 8,917,802 B1* | 12/2014 | Su | ................. | H04L 27/0012 375/349 |
| 9,036,688 B1* | 5/2015 | Su | ................. | H04L 27/0012 375/316 |
| 9,438,454 B1* | 9/2016 | Su | ................. | H04L 27/0014 |
| 2023/0155868 A1 | 5/2023 | Yamashita et al. | | |

FOREIGN PATENT DOCUMENTS

| | | | |
|---|---|---|---|
| JP | 2011176765 A | * | 9/2011 |
| WO | WO 2020/166005 A1 | | 8/2020 |

OTHER PUBLICATIONS

International Search Report and Written Opinion of the International Searching Authority dated Mar. 23, 2021 for Application No. PCT/JP2020/047482 with an English translation.
O'Shea et al., "Convolutional Radio Modulation Recognition Networks", arXiv:1602.04105v3 [cs.LG], Jun. 10, 2016, pp. 1-15.

* cited by examiner

*Primary Examiner* — Fayyaz Alam
(74) *Attorney, Agent, or Firm* — BIRCH, STEWART, KOLASCH & BIRCH, LLP (57) ABSTRACT

A modulation scheme identification apparatus includes: a modulation scheme specification circuitry that outputs a first probability distribution for a plurality of modulation schemes for a signal waveform input; a matching rate calculator that calculates a matching rate between the first probability distribution and a second probability distribution defined for a first modulation scheme that is a modulation scheme having a highest probability in the first probability distribution; and a determination circuitry that determines whether the modulation scheme of the signal waveform is the first modulation scheme or an unknown modulation scheme, based on the matching rate.

14 Claims, 7 Drawing Sheets

| NUMBER | SIGNAL WAVEFORM DATA | LABEL |
|---|---|---|
| 1 | ... | AM |
| 2 | ... | QPSK |
| ... | ... | ... |
| N | ... | FSK |

MODULATION SCHEME IDENTIFICATION APPARATUS, CONTROL CIRCUIT, STORAGE MEDIUM, AND MODULATION SCHEME IDENTIFICATION METHOD

CROSS-REFERENCE TO RELATED APPLICATION

This application is a continuation application of International Application PCT/JP2020/047482, filed on Dec. 18, 2020, and designating the U.S., the entire contents of which are incorporated herein by reference.

BACKGROUND OF THE INVENTION

1. Field of the Invention

The present disclosure relates to a modulation scheme identification apparatus, a control circuit, a storage medium, and a modulation scheme identification method for identifying modulation schemes.

2. Description of the Related Art

Identification of modulation schemes are required in cognitive radio to improve frequency utilization efficiency, radio wave monitoring to monitor unreliable radio waves, etc. A conventional modulation scheme identification apparatus calculates predetermined features from an input signal and compares the distribution of the calculated features with a database, thereby identifying a modulation scheme. Specifically, the conventional modulation scheme identification apparatus measures an amplitude probability distribution (APD) from an input signal, compares measured information with amplitude probability distribution information corresponding to modulation schemes stored in a database unit, and selects amplitude probability distribution information that matches the measured information most from among the amplitude probability distribution information, thereby specifying a modulation scheme. However, the conventional modulation scheme identification apparatus calculates predetermined features from an input signal and compares the distribution of the calculated features with the database. Consequently, in order to support many modulation schemes, it is required to design features having different values for all the modulation schemes, leading to complexed design.

For such a problem, Non Patent Literature 1, "Timothy J. O'Shea, Johnathan Corgan, and T. Charles Clancy "Convolutional Radio Modulation Recognition Networks", CoRR, vol. abs/1602, no. 04105, pp. 1-15, Jun. 2016." discloses a technique of automatically learning features by deep learning using a convolutional neural network, to solve a design difficulty. In the above Non Patent Literature 1, signal waveforms are used as inputs, and the convolutional neural network is trained to output corresponding modulation schemes, so as to be used as a classifier. Thus, a modulation scheme is specified without calculating features different for each modulation scheme. A modulation scheme identification method by deep learning using a convolutional neural network trains the convolutional neural network using data of known signal waveform, to use the convolutional neural network as a classifier, and calculates features automatically by deep learning, and thus can support many modulation schemes.

However, according to the above conventional technique, with signal waveforms as inputs, the convolutional neural network is trained to output corresponding modulation schemes, so as to be used as a classifier. There is thus a problem in that when a signal waveform according to a modulation scheme not included in training data is input, the convolutional neural network erroneously identifies the modulation scheme as one of the learned modulation schemes. There are various modulation schemes used for signals of wireless communication, radar, etc. In modulation scheme identification, it is required to be able to specify many modulation schemes, but it is difficult to support all modulation schemes including amplitude and phase-shift keying (APSK) that takes an arbitrary signal point arrangement. As for a signal waveform of an unsupported modulation scheme, it is required to output the fact that the modulation scheme is unknown.

SUMMARY OF THE INVENTION

To solve the above problem and achieve an object, the present disclosure is directed to a modulation scheme identification apparatus, including: a modulation scheme specification circuit to output a first probability distribution for a plurality of modulation schemes for a signal waveform input; a matching rate calculator to calculate a matching rate between the first probability distribution and a second probability distribution defined for a first modulation scheme that is a modulation scheme having a highest probability in the first probability distribution; and a determination circuit to determine whether a modulation scheme of the signal waveform is the first modulation scheme or an unknown modulation scheme, based on the matching rate.

DETAILED DESCRIPTION OF THE PREFERRED EMBODIMENTS

Hereinafter, a modulation scheme identification apparatus, a control circuit, a storage medium, and a modulation scheme identification method according to embodiments of the present disclosure will be described in detail with reference to the drawings.

First Embodiment

Figure 1:
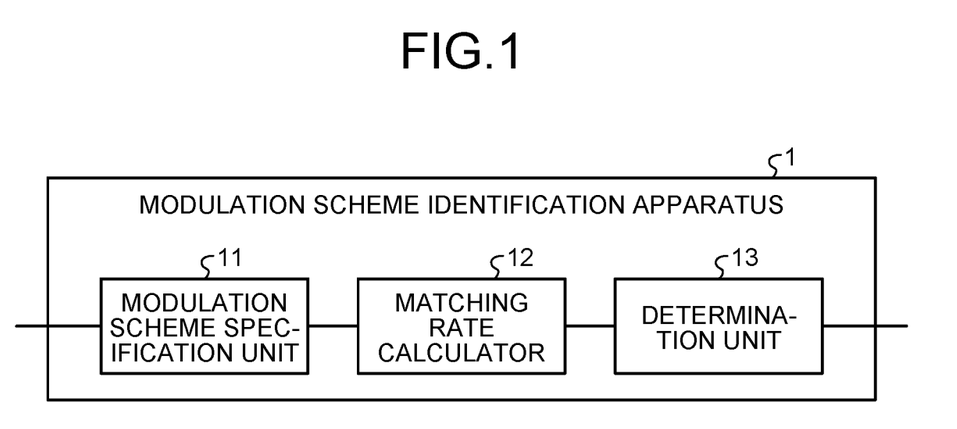
FIG. 1 is a block diagram illustrating a configuration example of a modulation scheme identification apparatus according to a first embodiment.

FIG. 1 is a block diagram illustrating a configuration example of a modulation scheme identification apparatus 1 according to a first embodiment. The modulation scheme identification apparatus 1 includes a modulation scheme specification unit 11, a matching rate calculator 12, and a determination unit 13.

The modulation scheme specification unit 11 outputs a probability distribution for a plurality of modulation schemes for a signal waveform input to the modulation scheme identification apparatus 1. The probability distribution output from the modulation scheme specification unit 11 is sometimes referred to as a first probability distribution.

The matching rate calculator 12 calculates a matching rate between the probability distribution output from the modulation scheme specification unit 11 and a probability distribution defined for a modulation scheme that has the highest probability in the probability distribution output from the modulation scheme specification unit 11. The modulation scheme having the highest probability in the probability distribution output from the modulation scheme specification unit 11 may be referred to as a first modulation scheme. The probability distribution defined for the first modulation scheme may be referred to as a second probability distribution.

The determination unit 13 determines whether the modulation scheme of the signal waveform input to the modulation scheme identification apparatus 1 is the first modulation scheme or an unknown modulation scheme that is not supported by the modulation scheme identification apparatus 1, based on the matching rate calculated by the matching rate calculator 12.

The operation of the modulation scheme identification apparatus 1 will be described. In the operation of the modulation scheme identification apparatus 1, deep learning is used for the modulation scheme specification unit 11. Thus, two operations which are a training phase and an inference phase are performed.

Figure 2:
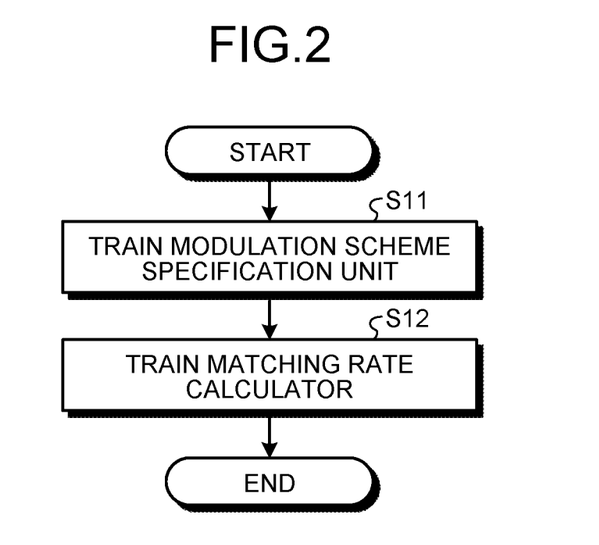
FIG. 2 is a flowchart illustrating training-phase operation of the modulation scheme identification apparatus according to the first embodiment.

First, the training phase will be described. FIG. 2 is a flowchart illustrating the training-phase operation of the modulation scheme identification apparatus 1 according to the first embodiment. The modulation scheme identification apparatus 1 trains the modulation scheme specification unit 11 (step S11). The training of the modulation scheme specification unit 11 is performed using a training data set including a plurality of pieces of signal waveform data and labels added as indicating modulation schemes corresponding to the pieces of signal waveform data.

Figure 3:
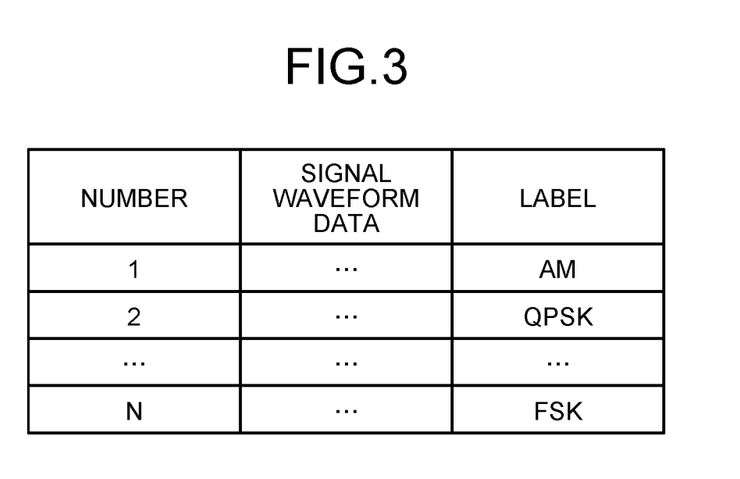
FIG. 3 is a diagram illustrating an example of a training data set used in training of a modulation scheme specification unit included in the modulation scheme identification apparatus according to the first embodiment.

FIG. 3 is a diagram illustrating an example of the training data set used in the training of the modulation scheme specification unit 11 included in the modulation scheme identification apparatus 1 according to the first embodiment. The training data set illustrated in FIG. 3 includes the above-described signal waveform data, labels, and numbers for identifying combinations of the pieces of signal waveform data and the labels. As the signal waveform, in-phase/quadrature-phase (IQ) signals, each of which is a combination of an in-phase signal and a quadrature signal resulting from performing quasi-synchronous detection on the signal waveform of a reception signal acquired actually, IQ signals simulated by computer simulation, or the like are presumable. The modulation schemes indicated by the labels to the signal waveforms may be a plurality of modulation schemes such as amplitude modulation (AM), frequency modulation (FM), frequency-shift keying (FSK), quadrature phase-shift keying (QPSK), and quadrature amplitude modulation (QAM).

When N signal waveforms are included in the training data set, a signal waveform $X_n$ is the nth signal waveform. For example, when the number of modulation schemes corresponding to the N signal waveforms is M, a vector with M elements $Y_n=[y_1, y_2, \ldots, y_m]$ is created in a one-hot encoding in which only the element of the corresponding modulation scheme is 1 and the others are 0, as an example. For example, if there are 100 signal waveforms in the training data set, each signal waveform corresponds to one of three modulation schemes (AM, FSK, or QPSK), and the modulation scheme corresponding to the third signal waveform is FSK, $Y_3=[0, 1, 0]$. Note that, although the vector is represented using the one-hot encoding in this example, the representation is not limited thereto as long as each value expresses a probability for a corresponding modulation scheme. The vector can be expressed as $Y_3=[0.2, 0.8, 0.1]$, for example. Furthermore, the probability distribution may be expressed in another way other than the vector.

Figure 4:
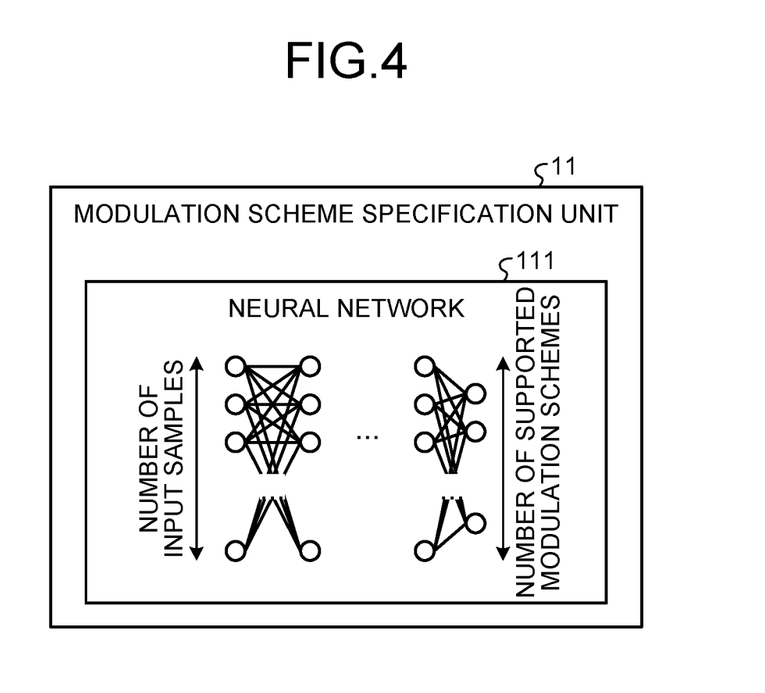
FIG. 4 is a diagram illustrating a configuration example of the modulation scheme specification unit included in the modulation scheme identification apparatus according to the first embodiment.

The modulation scheme specification unit 11 is implemented with a neural network as illustrated in FIG. 4. FIG. 4 is a diagram illustrating a configuration example of the modulation scheme specification unit 11 included in the modulation scheme identification apparatus 1 according to the first embodiment. The modulation scheme specification unit 11 may be implemented with a neural network 111, that is, use the neural network 111. The neural network 111 may be, for example, a multilayer perceptron, a deep neural network, a convolutional neural network, a recurrent neural network, or the like, or may be a combination of some of them. Internal parameters of the modulation scheme specification unit 11 are trained so as to output $Y_n$ when the signal waveform $X_n$ as described above is input. Consequently, when a signal waveform is input, the modulation scheme specification unit 11 can output a probability distribution in which an element indicating a modulation scheme appropriate to the signal waveform becomes the largest.

After the training of the modulation scheme specification unit 11, training of the matching rate calculator 12 is performed (step S12). Here, a signal waveform included in a training data set different from the training data set illustrated in FIG. 3 is input to the trained modulation scheme specification unit 11, and a probability distribution is output from the modulation scheme specification unit 11. The matching rate calculator 12 is trained using a machine learning algorithm such that, with the probability distribution output from the modulation scheme specification unit 11 as an input, the matching rate calculator 12 outputs a matching rate that indicates the probability that a modulation scheme having the highest probability is the correct modulation scheme. That is, the matching rate calculator 12 calculates the matching rate using the machine learning algorithm. The machine learning algorithm may be, for example, random forest or the like. Thus, when acquiring a probability distribution from the modulation scheme specification unit 11, the matching rate calculator 12 can obtain a soft decision value as to whether a modulation scheme corresponding to the highest probability in the probability distribution is justified.

Figure 5:
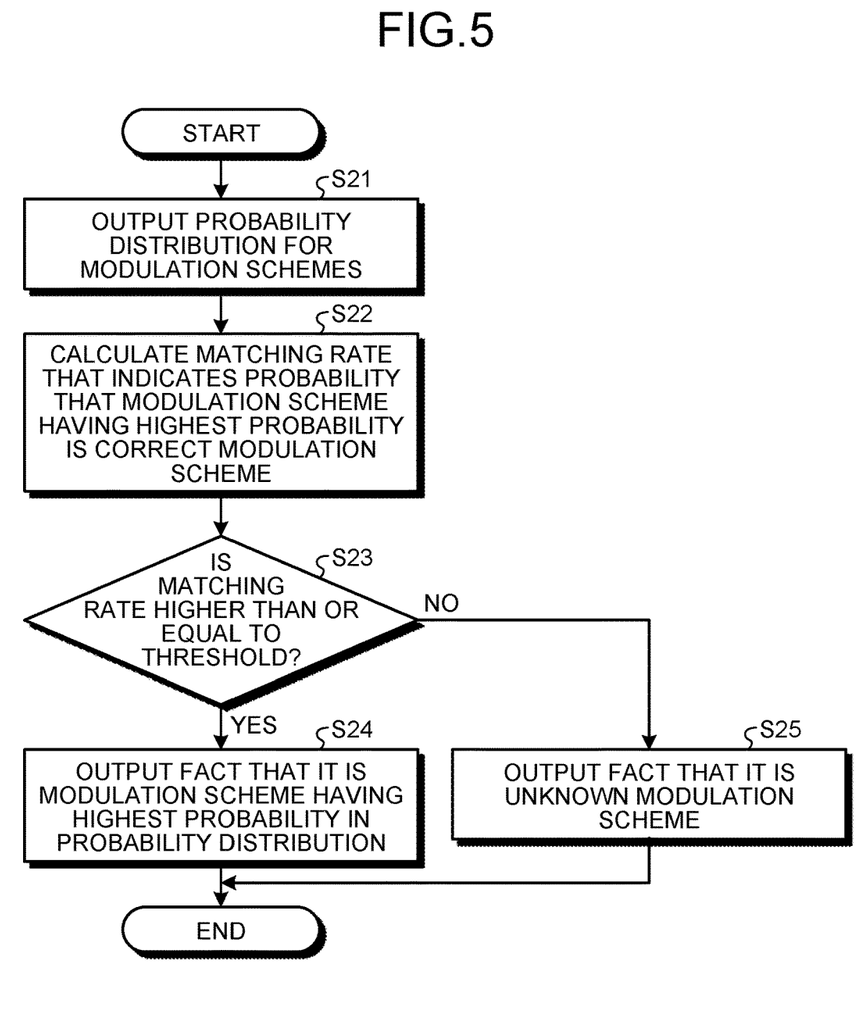
FIG. 5 is a flowchart illustrating inference-phase operation of the modulation scheme identification apparatus according to the first embodiment.

Next, the inference phase will be described. FIG. 5 is a flowchart illustrating the inference-phase operation of the modulation scheme identification apparatus 1 according to the first embodiment. In the modulation scheme identification apparatus 1, the modulation scheme specification unit 11 outputs a probability distribution Y' concerning the modulation schemes for a signal waveform X' input (step S21). With the probability distribution Y' output from the modulation scheme specification unit 11 as an input, the matching rate calculator 12 calculates a matching rate that indicates the probability that a modulation scheme having the highest probability in the probability distribution Y' is the correct modulation scheme (step S22). The matching rate calculator 12 outputs the calculated matching rate to the determination unit 13.

The determination unit 13 compares the matching rate calculated by the matching rate calculator 12 with a predetermined threshold (step S23). When the matching rate is higher than or equal to the threshold (step S23: Yes), the determination unit 13 determines and outputs the fact that the modulation scheme of the signal waveform X' input to the modulation scheme identification apparatus 1 is the modulation scheme having the highest probability in the probability distribution Y' (step S24). When the matching rate is less than the threshold (step S23: No), the determination unit 13 determines and outputs the fact that the modulation scheme of the signal waveform X' input to the modulation scheme identification apparatus 1 is an unknown modulation scheme that is not supported by the modulation scheme identification apparatus 1 (step S25). Thus, the determination unit 13 can determine and output the fact that the modulation scheme of a signal waveform input to the modulation scheme identification apparatus 1 is the first modulation scheme when the matching rate is higher than or equal to the threshold, and can determine and output the fact that the modulation scheme of a signal waveform input to the modulation scheme identification apparatus 1 is unknown when the matching rate is less than the threshold.

Next, a hardware configuration of the modulation scheme identification apparatus 1 will be described. In the modulation scheme identification apparatus 1, the modulation scheme specification unit 11, the matching rate calculator 12, and the determination unit 13 are implemented by processing circuitry. The processing circuitry may be implemented by a memory and a processor to execute a program stored in the memory, or may be implemented by dedicated hardware. The processing circuitry is also referred to as a control circuit.

Figure 6:
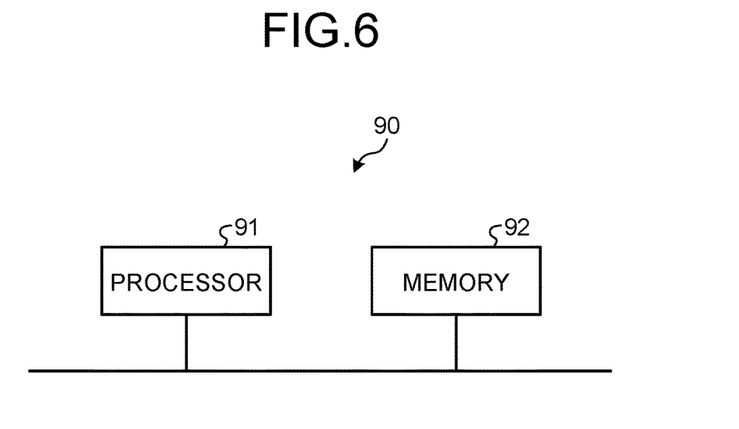
FIG. 6 is a diagram illustrating a configuration example of processing circuitry when a processor and memory implement processing circuitry included in the modulation scheme identification apparatus according to the first embodiment.

FIG. 6 is a diagram illustrating a configuration example of processing circuitry 90 when a processor 91 and a memory 92 implement the processing circuitry included in the modulation scheme identification apparatus 1 according to the first embodiment. The processing circuitry 90 illustrated in FIG. 6 is a control circuit and includes the processor 91 and the memory 92. When the processor 91 and the memory 92 constitute the processing circuitry 90, functions of the processing circuitry 90 are implemented by software, firmware, or a combination of software and firmware. The software or firmware is described as a program and stored in the memory 92. In the processing circuitry 90, the processor 91 reads and executes the program stored in the memory 92, thereby implementing the functions. That is, the processing circuitry 90 includes the memory 92 for storing the program that results in the execution of processing in the modulation scheme identification apparatus 1. This program can be said to be a program for causing the modulation scheme identification apparatus 1 to perform each function implemented by the processing circuitry 90. This program may be provided via a storage medium in which the program is stored, or may be provided via another means such as a communication medium.

The program is, in other words, a program that causes the modulation scheme identification apparatus 1 to perform a first step in which the modulation scheme specification unit 11 outputs a first probability distribution for a plurality of modulation schemes for a signal waveform input, a second step in which the matching rate calculator 12 calculates a matching rate between the first probability distribution and a second probability distribution defined for a first modulation scheme that is a modulation scheme having the highest probability in the first probability distribution, and a third step in which the determination unit 13 determines whether the modulation scheme of the signal waveform is the first modulation scheme or an unknown modulation scheme, based on the matching rate.

Here, the processor 91 is, for example, a central processing unit (CPU), a processing unit, an arithmetic unit, a microprocessor, a microcomputer, a digital signal processor (DSP), or the like. The memory 92 corresponds, for example, to nonvolatile or volatile semiconductor memory such as random-access memory (RAM), read-only memory (ROM), flash memory, an erasable programmable ROM (EPROM), or an electrically EPROM (EEPROM) (registered trademark), or a magnetic disk, a flexible disk, an optical disk, a compact disk, a mini disk, a digital versatile disc (DVD), or the like.

Figure 7:
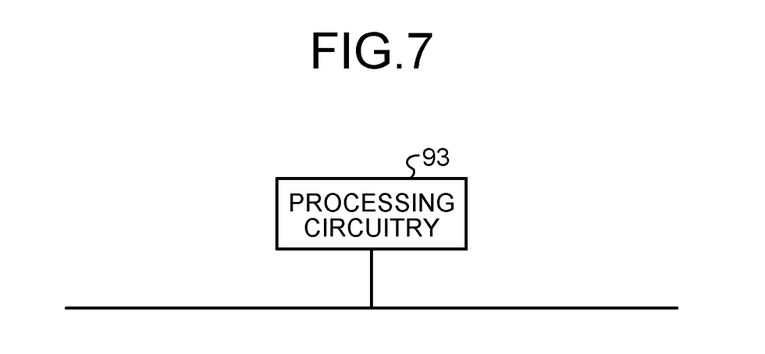
FIG. 7 is a diagram illustrating an example of processing circuitry when dedicated hardware constitutes the processing circuitry included in the modulation scheme identification apparatus according to the first embodiment.

FIG. 7 is a diagram illustrating an example of processing circuitry 93 when dedicated hardware constitutes the processing circuitry included in the modulation scheme identification apparatus 1 according to the first embodiment. The processing circuitry 93 illustrated in FIG. 7 corresponds, for example, to a single circuit, a combined circuit, a programmed processor, a parallel-programmed processor, an application-specific integrated circuit (ASIC), a field-programmable gate array (FPGA), or a combination of them. The processing circuitry may be implemented partly by dedicated hardware and partly by software or firmware. Thus, the processing circuitry can implement the above-described functions by dedicated hardware, software, firmware, or a combination of some of them.

As described above, according to the present embodiment, in the modulation scheme identification apparatus 1, the modulation scheme specification unit 11 automatically extracts features, using deep learning by the neural network 111, and outputs the probability distribution Y' for the modulation schemes that are the labels at the time of training for the input signal waveform X'. The matching rate calculator 12 compares the probability distribution Y' with the probability distribution when the training data is input, and calculates the matching rate indicating whether the probability distribution Y' is justified. The determination unit 13 makes a determination on the matching rate, using the threshold. Thus, for a plurality of supportable modulation schemes, the modulation scheme identification apparatus 1 can output the corresponding modulation scheme for the input signal waveform X', and for an unsupported modulation scheme, can output the fact that the modulation scheme is unknown. The modulation scheme identification apparatus 1 determines, when the training data is input, whether or not the probability distribution Y' for the modulation schemes, the probability distribution Y' being a result for specifying modulation scheme, matches the probability distribution. Thus, when the signal waveform X' of an unsupported modulation scheme is input, the modulation scheme identification apparatus 1 can determine and output the fact that the modulation scheme is unknown, thereby reducing erroneous identification.

Second Embodiment

In the first embodiment, the matching rate calculator 12 is machine-trained in advance to calculate the matching rate. A second embodiment describes a case where a matching rate calculator 12a performs comparison using a database unit 14 to calculate the matching rate, as will be described later.

Figure 8:
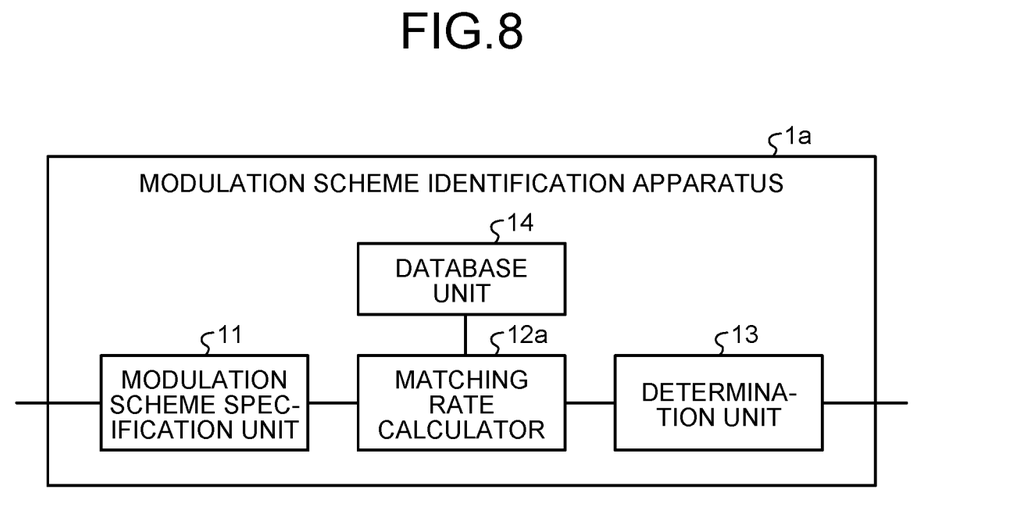
FIG. 8 is a block diagram illustrating a configuration example of a modulation scheme identification apparatus according to a second embodiment.

FIG. 8 is a block diagram illustrating a configuration example of a modulation scheme identification apparatus 1a according to the second embodiment. The modulation scheme identification apparatus 1a includes the modulation scheme specification unit 11, the matching rate calculator 12a, the determination unit 13, and the database unit 14. In the modulation scheme identification apparatus 1a, the matching rate calculator 12 is removed from and the matching rate calculator 12a and the database unit 14 are added to the modulation scheme identification apparatus 1 of the first embodiment illustrated in FIG. 1.

As described later, the database unit 14 stores mean values of probability distributions for each modulation scheme that are outputs from the modulation scheme specification unit 11 when training signals, which are different from those included in a training data set for training, are input to the modulation scheme specification unit 11.

The matching rate calculator 12a calculates the above-described matching rate using the second probability distribution defined for the first modulation scheme among the mean values of the probability distributions for each modulation scheme stored in the database unit 14.

The operation of the modulation scheme identification apparatus 1a will be described. Similarly to the modulation scheme identification apparatus 1 of the first embodiment, as the operation of the modulation scheme identification apparatus 1a, deep learning is used in the modulation scheme specification unit 11. Thus, there are two operations which are a training phase and an inference phase are performed.

Figure 9:
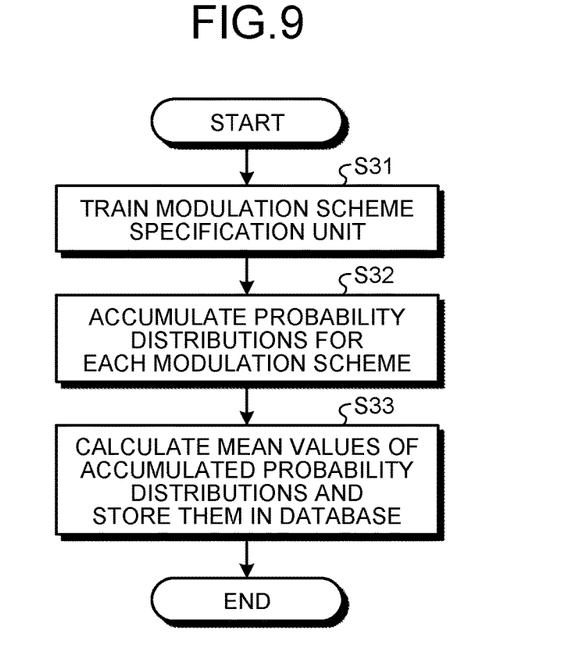
FIG. 9 is a flowchart illustrating training-phase operation of the modulation scheme identification apparatus according to the second embodiment.

First, the training phase will be described. FIG. 9 is a flowchart illustrating the training-phase operation of the modulation scheme identification apparatus 1a according to the second embodiment. The modulation scheme identification apparatus 1a trains the modulation scheme specification unit 11 (step S31). The operation in step S31 is the same as the operation in step S11 of the flowchart illustrated in FIG. 2.

Figure 10:
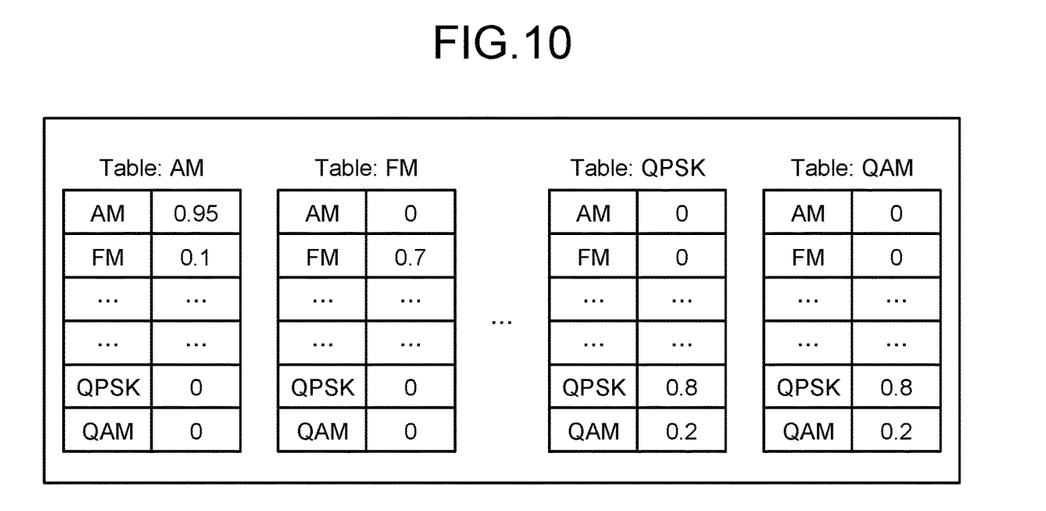
FIG. 10 is a diagram illustrating an example of probability distributions for each modulation scheme accumulated by a matching rate calculator of the modulation scheme identification apparatus according to the second embodiment.

The matching rate calculator 12a accumulates probability distributions for each modulation scheme output from the modulation scheme specification unit 11 (step S32). Here, as in the first embodiment, signal waveforms included in a training data set different from the training data set illustrated in FIG. 3 are input to the trained modulation scheme specification unit 11, and probability distributions are output from the modulation scheme specification unit 11. The matching rate calculator 12a accumulates the probability distributions for each modulation scheme on an individual modulation scheme basis as illustrated in FIG. 10. FIG. 10 is a diagram illustrating an example of probability distributions for each modulation scheme accumulated by the matching rate calculator 12a of the modulation scheme identification apparatus 1a according to the second embodiment. FIG. 10 illustrates an example in which AM, FM, QPSK, QAM, etc. are included as the modulation schemes. The matching rate calculator 12a calculates the mean values of the accumulated probability distributions and stores the calculated mean values in the database unit 14 (step S33). Here, the matching rate calculator 12a calculates the mean values of the accumulated probability distributions and stores the mean values in the database unit 14. However, in the modulation scheme identification apparatus 1a, another unit or component (not illustrated) may calculate the mean values of the accumulated probability distributions and store the mean values in the database unit 14.

Figure 11:
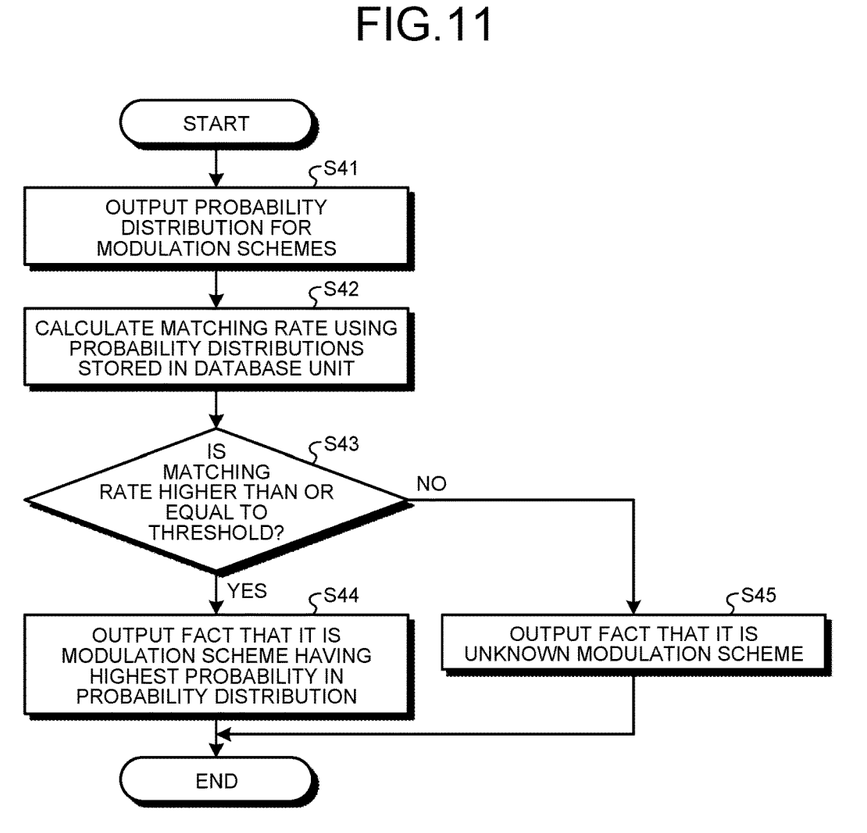
FIG. 11 is a flowchart illustrating inference-phase operation of the modulation scheme identification apparatus according to the second embodiment.

Next, the inference phase will be described. FIG. 11 is a flowchart illustrating the inference-phase operation of the modulation scheme identification apparatus 1a according to the second embodiment. In the modulation scheme identification apparatus 1a, the modulation scheme specification unit 11 outputs the probability distribution Y' for the modulation schemes for the input signal waveform X' (step S41). The operation in step S41 is the same as the operation in step S21 of the flowchart illustrated in FIG. 5. The matching rate calculator 12a calculates the matching rate using the probability distributions stored in the database unit 14 (step S42). Specifically, the matching rate calculator 12a calculates the matching rate between the probability distribution Y' output from the modulation scheme specification unit 11 and a probability distribution corresponding to a modulation scheme having the highest probability in the probability distribution Y' among the probability distributions stored in the database unit 14. For example, from an index representing the degree of similarity between discrete probability distributions, such as the Kullback-Leibler divergence, the matching rate calculator 12a calculates the matching rate such that the higher the degree of similarity, the larger the value becomes, and the lower the degree of similarity, the smaller the value becomes. The matching rate calculator 12a outputs the calculated matching rate to the determination unit 13. The subsequent operations in steps S43 to S45 in the determination unit 13 is the same as the operations in steps S23 to S25 in the flowchart illustrated in FIG. 5.

Next, a hardware configuration of the modulation scheme identification apparatus 1a will be described. In the modulation scheme identification apparatus 1a, the modulation scheme specification unit 11, the matching rate calculator 12a, the determination unit 13, and the database unit 14 are implemented by processing circuitry. The processing circuitry may be a memory and a processor to execute a program stored in the memory, or may be dedicated hardware, similarly to the modulation scheme identification apparatus 1 of the first embodiment.

As described above, according to the present embodiment, in the modulation scheme identification apparatus 1a, the modulation scheme specification unit 11 automatically extracts features, using deep learning by the neural network 111, and outputs the probability distribution Y' for the modulation schemes that are the labels at the time of training for the input signal waveform X'. The matching rate calculator 12a compares the probability distribution Y' with a probability distribution stored in the database unit 14, and calculates the matching rate indicating whether the probability distribution Y' is justified. The determination unit 13 makes a determination on the matching rate, using the threshold. Also in this case, the modulation scheme identification apparatus 1a can obtain the same effects as those of the modulation scheme identification apparatus 1 of the first embodiment. Further, the modulation scheme identification apparatus 1a can reduce the amount of calculation because the matching rate calculator 12a does not use a machine learning algorithm, unlike the modulation scheme identification apparatus 1 of the first embodiment.

Third Embodiment

In the first embodiment, the modulation scheme identification apparatus 1 includes the single modulation scheme specification unit 11 and the single matching rate calculator 12. In the second embodiment, the modulation scheme identification apparatus 1a includes the single modulation scheme specification unit 11 and the single matching rate calculator 12a. A third embodiment describes a modulation scheme identification apparatus 1b that includes a plurality of the modulation scheme specification units 11 and a plurality of the matching rate calculators 12, as will be described later.

Figure 12:
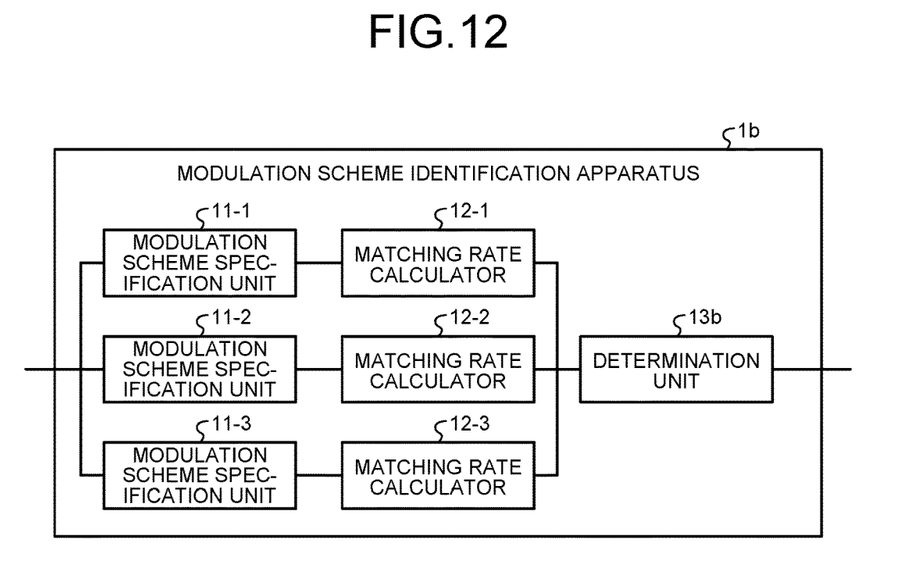
FIG. 12 is a block diagram illustrating a configuration example of a modulation scheme identification apparatus according to a third embodiment.

FIG. 12 is a block diagram illustrating a configuration example of the modulation scheme identification apparatus 1b according to the third embodiment. The modulation scheme identification apparatus 1b includes modulation scheme specification units 11-1, 11-2, and 11-3, matching rate calculators 12-1, 12-2, and 12-3, and a determination unit 13b.

The modulation scheme specification units 11-1 to 11-3 each perform the same operation as the modulation scheme specification unit 11 illustrated in FIG. 1 etc. The matching rate calculators 12-1 to 12-3 each perform the same operation as the matching rate calculator 12 illustrated in FIG. 1. As illustrated in FIG. 12, in the modulation scheme identification apparatus 1b, the modulation scheme specification unit 11-1 is connected to the matching rate calculator 12-1, the modulation scheme specification unit 11-2 is connected to the matching rate calculator 12-2, and the modulation scheme specification unit 11-3 is connected to the matching rate calculator 12-3. In the following description, the modulation scheme specification units 11-1 to 11-3 are sometimes referred to as the modulation scheme specification units 11 when not distinguished, and the matching rate calculators 12-1 to 12-3 are sometimes referred to as the matching rate calculators 12 when not distinguished.

The determination unit 13b determines whether the modulation scheme of a signal waveform input to the modulation scheme identification apparatus 1b is the first modulation scheme or an unknown modulation scheme that is not supported by the modulation scheme identification apparatus 1b, based on matching rates calculated by the matching rate calculators 12-1 to 12-3.

The operation of the modulation scheme identification apparatus 1b will be described. Similarly to the modulation scheme identification apparatus 1 of the first embodiment, as the operation of the modulation scheme identification apparatus 1b, deep learning is used in the modulation scheme specification units 11. Thus, there are two operations which are a training phase and an inference phase are performed.

Figure 13:
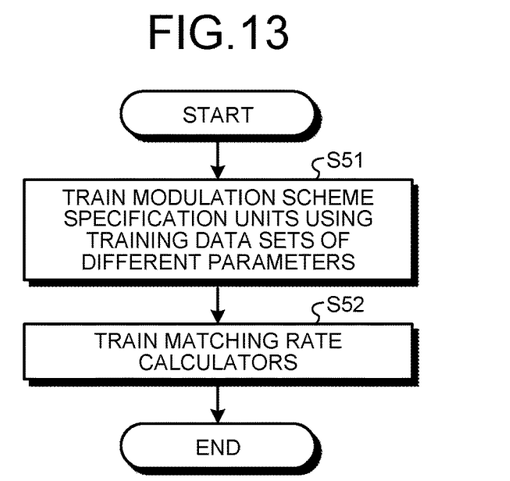
FIG. 13 is a flowchart illustrating training-phase operation of the modulation scheme identification apparatus according to the third embodiment.

First, the training phase will be described. FIG. 13 is a flowchart illustrating the training-phase operation of the modulation scheme identification apparatus 1b according to the third embodiment. The modulation scheme identification apparatus 1b trains the modulation scheme specification units 11-1 to 11-3, that is, the modulation scheme specification units 11, using training data sets of parameters different for the modulation scheme specification units 11-1 to 11-3 (step S51) with each other. For the different parameters, for example, the frequency offset, the signal-to-noise ratio, the symbol rate, etc. are changed for each of the modulation scheme specification units 11-1 to 11-3. Although the training data sets of the different parameters are used for the modulation scheme specification units 11-1 to 11-3, a training method itself for each of the modulation scheme specification units 11-1 to 11-3 is the same as the training method for the modulation scheme specification unit 11 described above.

The matching rate calculators 12-1 to 12-3, that is, the matching rate calculators 12 are trained (step S52). Here, signal waveforms included in training data sets different from the training data sets used in the training of the modulation scheme specification units 11-1 to 11-3 in step S51, are input to the trained modulation scheme specification units 11-1 to 11-3, and probability distributions are output from the modulation scheme specification units 11-1 to 11-3. Although different probability distributions are used for the matching rate calculators 12-1 to 12-3, a training method itself for each of the individual matching rate calculators 12-1 to 12-3 is the same as the training method for the matching rate calculator 12 described above.

Figure 14:
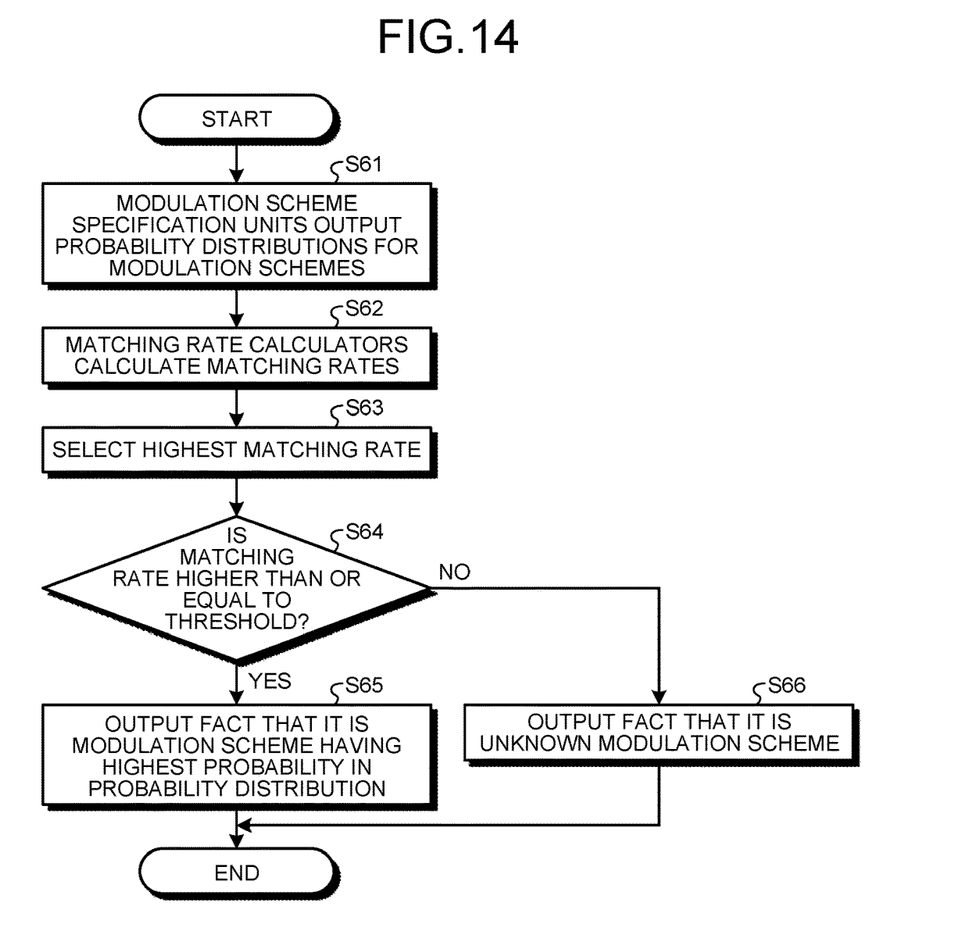
FIG. 14 is a flowchart illustrating inference-phase operation of the modulation scheme identification apparatus according to the third embodiment.

Next, the inference phase will be described. FIG. 14 is a flowchart illustrating the inference-phase operation of the modulation scheme identification apparatus 1b according to the third embodiment. In the modulation scheme identification apparatus 1b, the modulation scheme specification units 11-1 to 11-3 output the probability distributions Y' for the modulation schemes for the input signal waveform X' (step S61). As illustrated in FIG. 12, the same signal waveform X' is input to the modulation scheme specification units 11-1 to 11-3, unlike at the time of training. However, the modulation scheme specification units 11-1 to 11-3 have been trained with the respective training data sets of the different parameters. Therefore, it is expected that the probability distributions Y' with different data will be output from the modulation scheme specification units 11-1 to 11-3.

The matching rate calculators 12-1 to 12-3 receive the probability distributions Y' output from the connected modulation scheme specification units 11-1 to 11-3 as inputs, respectively, and each calculate a matching rate that indicates the probability that a modulation scheme having the highest probability in the probability distribution Y' is the correct modulation scheme. That is, each matching rate calculator 12 calculates the matching rate (step S62). The matching rate calculators 12-1 to 12-3 output the calculated matching rates to the determination unit 13b.

Upon acquiring the matching rates from the matching rate calculators 12-1 to 12-3, the determination unit 13b selects the highest matching rate from the acquired matching rates (step S63). The determination unit 13b compares the selected matching rate with a predetermined threshold (step S64). When the matching rate is higher than or equal to the threshold (step S64: Yes), the determination unit 13b determines and outputs the fact that the modulation scheme of the signal waveform X' input to the modulation scheme identification apparatus 1*b* is the modulation scheme having the highest probability in the probability distribution Y' output from one of the modulation scheme specification units 11-1 to 11-3 corresponding to the highest matching rate (step S65). When the matching rate is less than the threshold (step S64: No), the determination unit 13*b* determines and outputs the fact that the modulation scheme of the signal waveform X' input to the modulation scheme identification apparatus 1*b* is an unknown modulation scheme that is not supported by the modulation scheme identification apparatus 1*b* (step S66).

As described above, the modulation scheme identification apparatus 1*b* includes the modulation scheme specification units 11-1 to 11-3 trained by the training data sets of the different parameters, and the matching rate calculators 12-1 to 12-3 connected to the different modulation scheme specification units 11. In the modulation scheme identification apparatus 1*b*, the determination unit 13*b* can determine and output the fact that the modulation scheme of a signal waveform input to the modulation scheme identification apparatus 1*b* is the first modulation scheme when the highest matching rate of the matching rates calculated by the matching rate calculators 12-1 to 12-3 is higher than or equal to the threshold, and determine and output the fact that the modulation scheme of the signal waveform is unknown when the highest matching rate is less than the threshold.

Next, a hardware configuration of the modulation scheme identification apparatus 1*b* will be described. In the modulation scheme identification apparatus 1*b*, the modulation scheme specification units 11-1 to 11-3, the matching rate calculators 12-1 to 12-3, and the determination unit 13*b* are implemented by processing circuitry. The processing circuitry may be a memory and a processor to execute a program stored in the memory, or may be dedicated hardware, as is the case with the modulation scheme identification apparatus 1 of the first embodiment.

The present embodiment has been described based on the modulation scheme identification apparatus 1 of the first embodiment, but is also applicable to the second embodiment. In this case, the modulation scheme identification apparatus 1*b* has a configuration in which the matching rate calculators 12-1 to 12-3 are removed from the configuration of FIG. 12, and matching rate calculators 12*a*-1 to 12*a*-3 and database units 14-1 to 14-3 are added. Each of the matching rate calculators 12*a*-1 to 12*a*-3 performs the same operation as the matching rate calculator 12*a* illustrated in FIG. 8. Each of the database units 14-1 to 14-3 has the same configuration as that of the database unit 14 illustrated in FIG. 8.

As described above, according to the present embodiment, in the modulation scheme identification apparatus 1*b*, the modulation scheme specification units 11-1 to 11-3 are trained with the training data set of the different parameters, and the matching rate calculators 12-1 to 12-3 compare the probability distributions Y' output from the connected modulation scheme specification units 11-1 to 11-3 with the probability distributions when the training data is input, and calculate the matching rates indicating whether the probability distributions Y' are appropriate. The determination unit 13*b* selects the highest matching rate and makes a determination on the matching rate using the threshold. Consequently, the modulation scheme identification apparatus 1*b* selects the output of the modulation scheme specification unit 11 trained with the parameters most similar to the input signal waveform X' through the matching rate calculator 12, and thus can improve modulation scheme determination accuracy as compared with the modulation scheme identification apparatus 1 of the first embodiment and the modulation scheme identification apparatus 1*a* of the second embodiment.

The modulation scheme identification apparatus according to the present disclosure supports the plurality of modulation schemes and, for a signal waveform of an unsupported modulation scheme, can determine the fact that the modulation scheme is unknown.

The configurations described in the above embodiments illustrate an example and can be combined with another known art. Some of the embodiments can be combined with each other. The configurations can be partly omitted or changed without departing from the gist.

What is claimed is:

1. A modulation scheme identification apparatus, comprising:
    a modulation scheme specification circuit to output a first probability distribution for a plurality of modulation schemes for a signal waveform input;
    a matching rate calculator comprising processing circuitry to calculate a matching rate between the first probability distribution and a second probability distribution defined for a first modulation scheme that is a modulation scheme having a highest probability in the first probability distribution; and
    a determination circuit to determine whether a modulation scheme of the signal waveform is the first modulation scheme or an unknown modulation scheme, based on the matching rate.

2. The modulation scheme identification apparatus according to claim 1, wherein
    the modulation scheme specification circuit uses a neural network.

3. The modulation scheme identification apparatus according to claim 1, wherein
    the matching rate calculator calculates the matching rate by a machine learning algorithm.

4. The modulation scheme identification apparatus according to claim 1, comprising:
    a database storing mean values of probability distributions for each modulation scheme that are outputs from the modulation scheme specification circuit when training signals different from a training data set at a time of training are input to the modulation scheme specification circuit, wherein
    the matching rate calculator calculates the matching rate using the second probability distribution defined for the first modulation scheme among the mean values of the probability distributions for each modulation scheme stored in the database circuit.

5. The modulation scheme identification apparatus according to claim 1, wherein
    the determination circuit outputs a fact that the modulation scheme of the signal waveform is the first modulation scheme when the matching rate is higher than or equal to a threshold, and outputs a fact that the modulation scheme of the signal waveform is unknown when the matching rate is less than the threshold.

6. The modulation scheme identification apparatus according to claim 1, comprising:
    a plurality of the modulation scheme specification circuits trained with training data sets of different parameters; and
    a plurality of the matching rate calculators each connected to a different one of the modulation scheme specification circuits, wherein the determination circuit outputs a fact that the modulation scheme of the signal waveform is the first modulation scheme when the highest matching rate of the matching rates calculated by the plurality of matching rate calculators is higher than or equal to a threshold, and outputs a fact that the modulation scheme of the signal waveform is unknown when the highest matching rate is less than the threshold.

7. A control circuit to control a modulation scheme identification apparatus, the control circuit causing the modulation scheme identification apparatus to perform
    output of a first probability distribution for a plurality of modulation schemes for a signal waveform input,
    calculation of a matching rate between the first probability distribution and a second probability distribution defined for a first modulation scheme that is a modulation scheme having a highest probability in the first probability distribution, and
    determination as to whether a modulation scheme of the signal waveform is the first modulation scheme or an unknown modulation scheme, based on the matching rate.

8. A non-transitory storage medium storing a program to control a modulation scheme identification apparatus, the program causing the modulation scheme identification apparatus to perform
    output of a first probability distribution for a plurality of modulation schemes for a signal waveform input,
    calculation of a matching rate between the first probability distribution and a second probability distribution defined for a first modulation scheme that is a modulation scheme having a highest probability in the first probability distribution, and
    determination as to whether a modulation scheme of the signal waveform is the first modulation scheme or an unknown modulation scheme, based on the matching rate.

9. A modulation scheme identification method in a modulation scheme identification apparatus, the method comprising:
    outputting a first probability distribution for a plurality of modulation schemes for a signal waveform input;
    calculating a matching rate between the first probability distribution and a second probability distribution defined for a first modulation scheme that is a modulation scheme having a highest probability in the first probability distribution; and
    determining whether a modulation scheme of the signal waveform is the first modulation scheme or an unknown modulation scheme, based on the matching rate.

10. The modulation scheme identification method according to claim 9, wherein
    in the outputting, a neural network is used.

11. The modulation scheme identification method according to claim 9, wherein
    in the calculating, the matching rate is calculated using a machine learning algorithm.

12. The modulation scheme identification method according to claim 9, further includes
    storing mean values of probability distributions for each modulation scheme that are outputs in the outputting when training signals different from a training data set at a time of training are input, and
    in the calculating, the matching rate using the second probability distribution defined for the first modulation scheme among the mean values of the probability distributions for each modulation scheme stored.

13. The modulation scheme identification method according to claim 9, wherein
    in the determining, a fact that the modulation scheme of the signal waveform is the first modulation scheme is output when the matching rate is higher than or equal to a threshold, and a fact that the modulation scheme of the signal waveform is unknown is output when the matching rate is less than the threshold.

14. The modulation scheme identification method according to claim 9, wherein
    in the outputting, a plurality of the first probability distributions trained with training data sets of different parameters are generated,
    in the calculating, the matching rate is calculated with respect to each of the first probability distributions, and
    in the determining, a fact that the modulation scheme of the signal waveform is the first modulation scheme is output when the highest matching rate of the matching rates calculated by the plurality of matching rate calculators is higher than or equal to a threshold, and outputs a fact that the modulation scheme of the signal waveform is unknown is output when the highest matching rate is less than the threshold.

* * * * *